T. M. MUELLER.
ELECTRIC MOTOR ARMATURE WINDING AND METHOD OF APPLYING THE SAME.
APPLICATION FILED APR. 6, 1914.
1,199,097.
Patented Sept. 26, 1916.
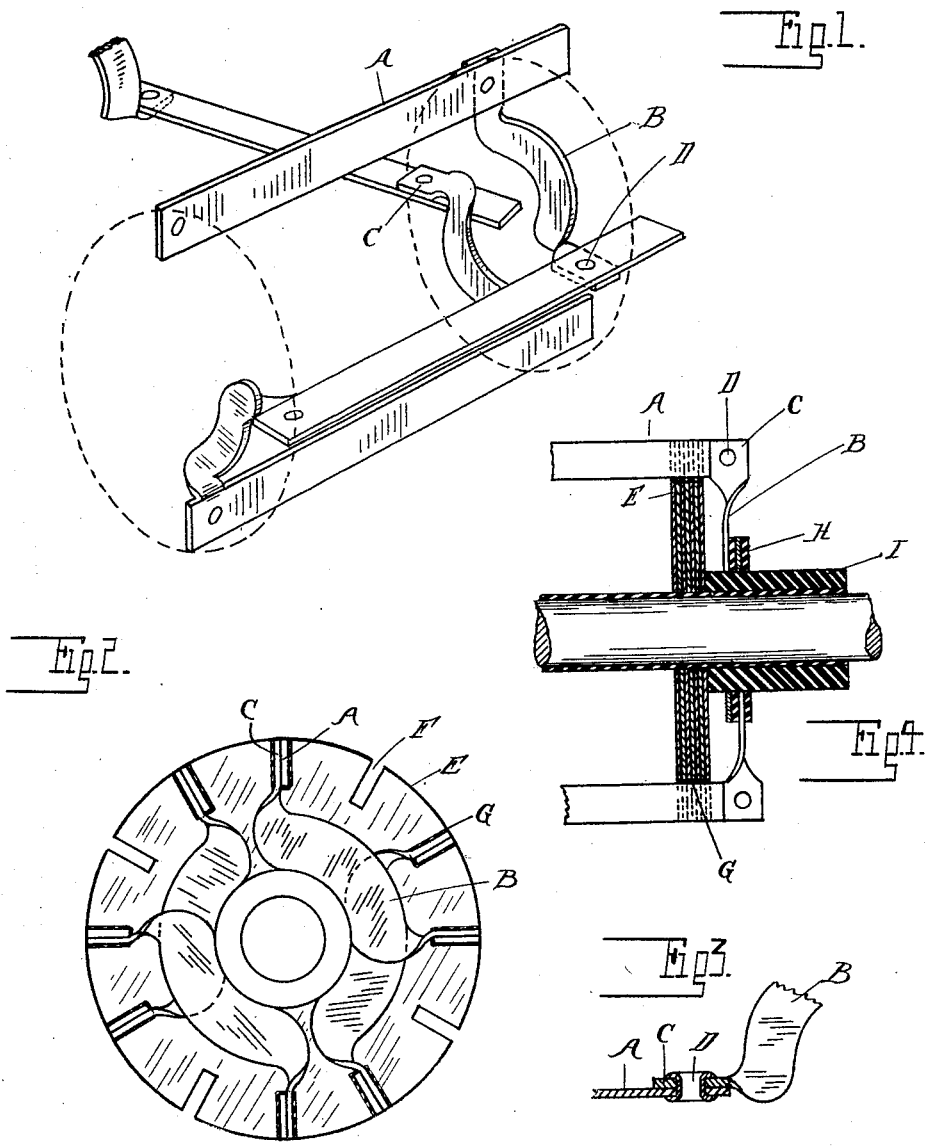
WITNESSES:
INVENTOR
Theodor M. Mueller
BY
Whittemore Hulbert & Whittemore
ATTORNEYS

UNITED STATES PATENT OFFICE.

THEODOR M. MUELLER, OF DETROIT, MICHIGAN, ASSIGNOR TO MAXIMUM ELECTRICAL COMPANY, OF DETROIT, MICHIGAN, A CORPORATION OF MICHIGAN.

ELECTRIC-MOTOR-ARMATURE WINDING AND METHOD OF APPLYING THE SAME.

1,199,097.     Specification of Letters Patent.     Patented Sept. 26, 1916.

Application filed April 6, 1914. Serial No. 830,014.

*To all whom it may concern:*

Be it known that I, THEODOR M. MUELLER, a subject of the Emperor of Germany, residing at Detroit, in the county of Wayne and State of Michigan, have invented certain new and useful Improvements in Electric-Motor-Armature Windings and Methods of Applying the Same, of which the following is a specification, reference being had therein to the accompanying drawings.

The invention relates to armatures for electric motors and has for its object the obtaining of a construction in which the active portions of the windings are connected with each other by articulated, fashioned sections, thereby permitting the ready engagement with the armature core.

To this end the invention comprises the peculiar construction of the articulated sections and the method of engaging and securing the same to the core, as hereinafter set forth.

In the drawings:—Figure 1 is a perspective view showing the armature core in dotted lines, and in full lines a portion of the articulated winding as being applied thereto; Fig. 2 is an end elevation of the armature; Fig. 3 is a longitudinal section through one of the articulated joints; and Fig. 4 is a longitudinal section through one end of the armature.

My improved construction of armature is of that type in which flat ribbon windings, which form the active portion of the circuit, are cross connected with each other by flat end sections arranged in a plane transverse to the axis. Such a construction has the advantage that the longitudinal dimension of the space required for the end connections is greatly diminished from that necessary for the more common form of winding. It also has the further advantage that the active portions of the conductor being comparatively thin and separated from each other by insulation in radial planes, lessen the formation of eddy currents. To maintain the full cross section in the connecting end portions, the latter must be of sufficient width to render them inflexible and consequently difficulty is experienced in applying the windings thus formed to the armature core. This difficulty I have overcome by articulating the joint between the active portions and the cross connecting portions of the conductor, so as to permit them to be wound as readily as a flexible conductor, and after placed in position the articulated joints are soldered or otherwise united so as to avoid resistance.

In detail, A are the active portions of the conductor, which, as shown, are in the form of thin flat bars.

B are the cross connecting portions, preferably sheet metal stampings, of segmental form and provided with ears C which are twisted into a plane at right angles to the main portion thereof. The bars A and ears C are attached to each other by rivets D, preferably of hollow or tubular form, as shown in Fig. 3, and sufficient freedom is provided to permit of pivotal action on said rivets.

In the method of forming armatures, a series of alternate members A and B, pivotally united as just described, are then engaged with the armature core E by first placing the end bar A in one of the radial slots F, then adjusting the next adjacent cross connection B so as to lie across the end of the core, then placing the next succeeding portion A in the radial slot with which it registers, etc., until the entire winding is engaged. At the same time that the winding is thus placed, insulating strips G are placed adjacent to the active portions A of the conductor, and insulating disks H are arranged between the adjacent overlapping connecting segments B. There is also an insulating sleeve I which separates these segments from the shaft J for the armature. After the windings are thus positioned, each of the articulated joints is soldered, brazed or welded so as to form a molecular connection and avoid the introduction of resistance. Where the soldering method is employed the adjacent surfaces of the sections are preferably first tinned, so that a slight application of heat is all that is necessary to cause them to unite. Either the entire winding or convenient portions thereof may be assembled before being applied to the core.

What I claim as my invention is:—

1. The process of winding an armature, which consists in pivotally connecting rigid bars with rigid cross connections to form articulated coils, and positioning the bars and cross connections on the armature by swinging the bars in axial planes.

2. An armature winding, comprising a series of articulated sections alternately consisting of thin flat bars and segments, the latter having ears twisted into the plane of said bars and pivotally united therewith.

3. An armature winding, comprising a series of alternate straight flat thin bars and flat thin segments pivotally connected to each other to extend in transverse planes.

4. An armature, comprising a laminated core and a winding formed of articulated sections alternately consisting of flat, thin bars for engaging radial slots in said core, and flat segments pivotally connected to said bars in transverse planes and lying in parallel planes transverse to the axis of the armature.

5. An armature, comprising a laminated core and a winding formed of a series of articulated sections alternately consisting of thin, flat, straight bars for engaging radial slots in said core, and thin, flat segments having twisted ears pivotally engaging said bars.

6. The method of forming armatures, comprising the formation of a series of articulated sections alternately constituting active and cross connecting portions of the conductor, the winding of said articulated sections upon the armature core to properly position the same relative thereto, and subsequently molecularly uniting the articulated joints to maintain the electrical conductivity thereof.

7. The method of forming armatures, comprising the uniting of a series of alternate thin, flat, straight bars and thin, flat connecting segments to form articulated joints therebetween, the winding of the series upon the armature core to properly position the same, and molecularly uniting the articulated joints to maintain conductivity.

8. The process of winding a slotted armature which consists in pivotally connecting rigid bars with rigid cross connections, positioning the bars and cross connections on the armature by swinging the bars in the plane of the slots and into such slots, and molecularly uniting the bars and cross connections.

In testimony whereof I affix my signature in presence of two witnesses.

THEODOR M. MUELLER.

Witnesses:
JAMES P. BARRY,
W. K. FORD.